United States Patent
Oberg

(10) Patent No.: US 7,286,312 B1
(45) Date of Patent: Oct. 23, 2007

(54) DC-OFFSET COMPENSATION LOOPS FOR MAGNETIC RECORDING SYSTEM

(75) Inventor: Mats Oberg, Cupertino, CA (US)

(73) Assignee: Marvell International Ltd., Hamilton (BM)

(\*) Notice: Subject to any disclaimer, the term of this patent is extended or adjusted under 35 U.S.C. 154(b) by 0 days.

(21) Appl. No.: 11/463,280

(22) Filed: Aug. 8, 2006

Related U.S. Application Data

(62) Division of application No. 10/737,648, filed on Dec. 15, 2003, now Pat. No. 7,116,504.

(60) Provisional application No. 60/472,073, filed on May 20, 2003, provisional application No. 60/457,613, filed on Mar. 25, 2003.

(51) Int. Cl.
*G11B 5/09* (2006.01)
*H03L 5/00* (2006.01)

(52) U.S. Cl. .................. 360/39; 327/307; 375/319; 375/341; 375/350

(58) Field of Classification Search ............... 327/307
See application file for complete search history.

(56) References Cited

U.S. PATENT DOCUMENTS

| | | | |
|---|---|---|---|
| 4,486,740 A | 12/1984 | Seidel | |
| 5,095,496 A | 3/1992 | Jang | |
| 5,222,078 A | 6/1993 | Cason et al. | |
| 5,442,492 A | 8/1995 | Cunningham et al. | |
| 5,566,213 A | 10/1996 | Carsello | |
| 5,821,795 A | 10/1998 | Yasuda et al. | |
| 6,204,980 B1 | 3/2001 | Momtaz et al. | |
| 6,219,088 B1 | 4/2001 | Liu et al. | |
| 6,332,205 B1 | 12/2001 | Conway | |
| 6,396,254 B1 | 5/2002 | Feyh et al. | |
| 6,446,236 B1 | 9/2002 | McEwen et al. | |
| 6,581,181 B1 | 6/2003 | Sonu | |
| 6,625,235 B1 | 9/2003 | Coker et al. | |
| 6,856,790 B1 * | 2/2005 | He ............................ | 455/63.4 |

OTHER PUBLICATIONS

Bergmans, Jan W.M., Chapter 8.8.2 "Digital Baseband Transmission and Recording", 1996 Kluwer Academic Publishers, Dordrecht, The Netherlands, pp. 425-426.

\* cited by examiner

*Primary Examiner*—Andrea Wellington
*Assistant Examiner*—Dan I Davidson

(57) ABSTRACT

An apparatus, method, and system for providing dc offset reduction in a communications channel include two or more feedback loops to generate dc offset correction signals, which in turn are combined with an input analog signal and a processed digital signal thereby reducing dc offset. Each feedback loop may include an adaptive filter. At least one feedback loop may be responsive to an error signal that represents the difference between the delayed input of a first detector, and its output. Further, the dc offset correction signal, partially delayed, may be added to the error signal, thereby improving the response time of the dc offset correction loop.

51 Claims, 10 Drawing Sheets

Loop Filter Type 1
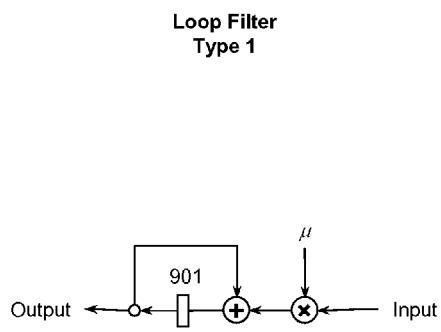
Loop Filter Type 2
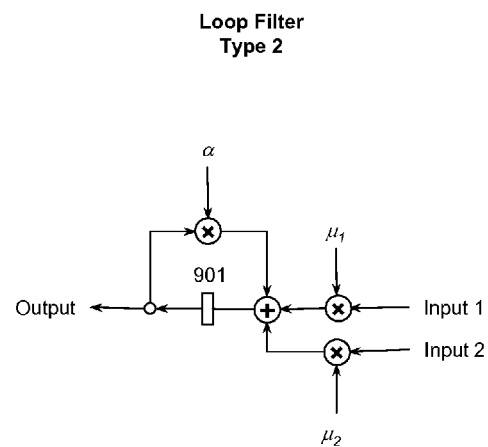
Fig. 9a
Fig. 9b

DC-OFFSET COMPENSATION LOOPS FOR MAGNETIC RECORDING SYSTEM

CROSS-REFERENCE TO RELATED APPLICATIONS

This application is a divisional application of U.S. application Ser. No. 10/737,648 filed Dec. 15, 2003, now U.S. Pat. No. 7,116,504 which claims the benefit of Provisional Application No. 60/457,613, filed Mar. 25, 2003 and Provisional Application No. 60/472,073, filed May 20, 2003. This application incorporates these applications by reference.

BACKGROUND OF THE INVENTION

1. Field of the Invention

This invention relates in general to the field of information storage, and more particularly to baseline wander correction and reduction of dc noise components in Hard Disk Drive (HDD) read channels.

2. Description of the Related Art

Hard disk drives (HDD) typically comprise at least one disk having a magnetic medium for storing information, a spindle, a controller for controlling disk rotational speed, a transducing head (for reading and writing data), a servo actuator assembly including a positioning controller for positioning the head over the appropriate disk track, and data channels for transmitting data to and from the disk. The transducing head reads data from and writes data to the disk in data blocks having either fixed or variable length. A data block comprises a preamble (for acquiring timing signals), timing bits, a position error field, address bits, data bits, and error correction bits. Data blocks are recorded in sectors in concentric tracks. A track may comprise several sectors. The number of sectors may depend on the radial location of the track on the disk. FIG. 1 shows a typical HDD as described above.

Data channels on HDD transmit and receive data via a communication medium. HDD and communication systems utilize similar techniques to encode data for storage and retrieval or for transmission and reception wherein data is encoded into a form in which it may be easily manipulated. Most modern applications of such systems encode data as numeric or digital information, wherein discrete numeric values are used to represent user data.

The storage or communication media do not directly manipulate such digital data. Rather, these media store or transmit analog signals representative of the digital data. For example, encoded digital information may be represented as magnetic flux transitions stored on a magnetic disk of an HDD. Two known ways of recording data magnetically on a disk are longitudinal recording and perpendicular recording. In longitudinal recording, as the name implies flux transitions are recorded side by side in a lengthwise fashion. In perpendicular recording the flux transitions are "stood on end," as it were. Details of implementation of longitudinal and perpendicular recording are very well known to ordinarily skilled artisans, and so need not be detailed here.

As disk drive data densities have increased, the need to put more flux transitions has become more acute. Perpendicular recording has been known for some time. However, problems associated with performing perpendicular recording have prevented its adoption.

Data recorded on a disk may be retrieved to decode the signals and reproduce the encoded digital data. A read channel reads or receives the encoded data and reproduces the original digital signal. In general, a read channel includes a transducer component that senses the analog signal and digital processing components that detect sequences of changes in the signal that represent encoded digital data. For example, a read channel used in a magnetic storage device includes a transducer head that senses the magnetic flux transitions and produces a continuous analog signal that must then be detected and decoded. In general, the shape of the continuous waveform represents the encoded digital data.

Analog signal processing circuitry, such as amplifiers, filters, and converters, introduces a dc offset that varies as a function of temperature and signal gain resulting in a signal level shift which, if uncorrected can degrade performance of the data recovery system. The dc offset raises or lowers the normal peaks and valleys of the analog signal and the changing levels of the dc offset cause baseline wander that adversely affects the read channel gain, stability and overall quality.

Varying dc offset causes baseline wander, which is low frequency disturbance of a radio frequency signal causing variations in the peak values of a signal. This dc offset can be a problem for both longitudinal and perpendicular recording. In perpendicular recording, the main cause of baseline wander in perpendicular recording is the pre-amplifier and the read channel are ac coupled. The ac coupling acts as a high pass filter. Since the perpendicular recording read back signal contains significant low frequency components, the high pass filter introduces baseline wander.

One known approach to canceling the dc offset is to block dc. Typically, blocking uses ac coupling, wherein a coupling capacitor is placed at the output of the analog circuit element. Blocking can lower dc offset arising on the analog input line. However, it does not remove any dc offset caused by digital signal processing. Thus, blocking is used on the communication line outside the read channel. One disadvantage of dc blocking is that the capacitors necessary for blocking the dc offset occupy considerable chip space, thereby making blocking unsuited for applications when a read channel is implemented on an integrated circuit. Accordingly, blocking is not a very effective technique for handling dc offset in a read channel.

Another approach, shown in FIG. 2, provides a feedback loop to remove as much of the dc noise as possible. In FIG. 2, an analog input signal passes through a filter, such as continuous time filter (CTF) 202, and is subtracted from a dc correction signal to form a corrected analog signal. An analog-to-digital converter (ADC) 204 samples the corrected analog signal to provide a digital signal. This digital signal passes through a finite impulse response (FIR) filter 205 to remove intersymbol interference, and then to a Viterbi algorithm bit detector 207. The bit detector 207 provides a digital estimate of the analog input signal. A summer subtracts the output of the bit detector from the input of the bit detector to form an error signal e0. This error signal is the difference between estimated data and the sampled data.

The error signal enters a loop filter 211, and is biased with a constant loop gain, $\mu 1$, and then is summed with the current value of the dc correction signal. The current value of the dc correction signal results from delaying the biased error signal. The dc correction signal is converted to an analog signal with a digital to analog converter (DAC) 228 and then is summed with the filtered input signal.

Copending, commonly assigned application, Ser. No. 09/536,120 filed Mar. 27, 2000 (now U.S. Pat. No. 6,856,790), incorporated herein by reference, shows still another approach wherein the dc correction circuitry has a first and a second feedback loop. Referring now to FIG. 3, a summer subtracts the output from the input of the bit detector from the input to form an error signal e0. This error signal is the difference between estimated data and the sampled data. This error signal, e0, provides the input to the first dc feedback loop, including a first loop filter 311. The first loop filter 311 includes a first biasing circuit, which is connected to the input to receive the error signal and to multiply the error signal by a first loop gain constant to produce a first product. The first product is an input to a first summer circuit. The first summer circuit is additionally connected to the output of the first dc feedback loop to receive a current first dc noise cancellation signal. The first summer circuit adds the first product with the current first dc offset cancellation signal to produce a next first dc offset cancellation signal. An accumulator circuit is connected to the first summer circuit to produce the feedback loop output.

A second summer combines the error signal, e0, and the output of the first feedback loop thereby restoring the first error correction signal. The output of that second summer is input to a second dc feedback loop, including a second loop filter 313. In the second loop filter 313, a second biasing circuit combines the restored first error correction signal and a second loop gain constant, μ2, to form a second product that is an input to a third summer circuit. The third summer circuit is additionally connected to the output of the second dc feedback loop to receive a current second dc offset cancellation signal. The third summer circuit adds the second product with the current second dc offset cancellation signal to produce a next second dc offset cancellation signal. A second accumulator is connected to the third summer circuit to produce the second dc offset cancellation signal. The second dc offset cancellation signal then passes to an digital-to-analog (DAC) converter 328 and is then recombined with the input signal.

SUMMARY OF THE INVENTION

The present invention is directed to improved signal processing circuitry for reducing baseline wander and dc offset. To address the stated need and fulfill other desired objectives, in accordance with the invention, a communications read channel provides circuitry for removing dc components from a signal acquired by the read channel. One or more loop filters may be provided, providing corrections to a digital signal, and optionally to the analog input signal. The invention is applicable to HDDs using either longitudinal and perpendicular recording.

BRIEF DESCRIPTION OF THE DRAWINGS

FIGS. 9a and 9b show the details of the feedback loop filters having one or two inputs.

DETAILED DESCRIPTION OF EMBODIMENTS

In a read channel for a magnetic recording system, a bit detector might be sensitive to a dc offset of the input signal when matched to a target that is not dc free. The analog circuitry and the high-pass filtering of a signal from perpendicular recording media are common sources of dc offsets. The dc offset caused by the analog circuitry is normally stationary and changes very little during a sector of data. The high-pass filtering due to lower high-pass cut-off corners used in perpendicular recording results in a faster varying dc offset. Therefore, the inventive circuit shown in FIG. 4 incorporates features to overcome the problem of dc offset caused by perpendicular recording.

In general, the inventive circuitry provides one or more feedback loops to correct the dc offset in the digital domain or in both the digital and analog domains. Each of the feedback loops comprises a loop filter having one or two loop inputs. The first type, shown in FIG. 9a, comprises a single loop input whereas the second type, shown in FIG. 9b, comprises two loop inputs. Each loop filter has a biasing circuit to multiply each loop input by a constant. A summer combines each biased loop input with the loop filter output (in the case of the loop filter having two loop input signals, the loop filter output is attenuated with an additional biasing circuit.) An accumulator 901, coupled with the summer, provides the feedback loop output.

Figure 1:
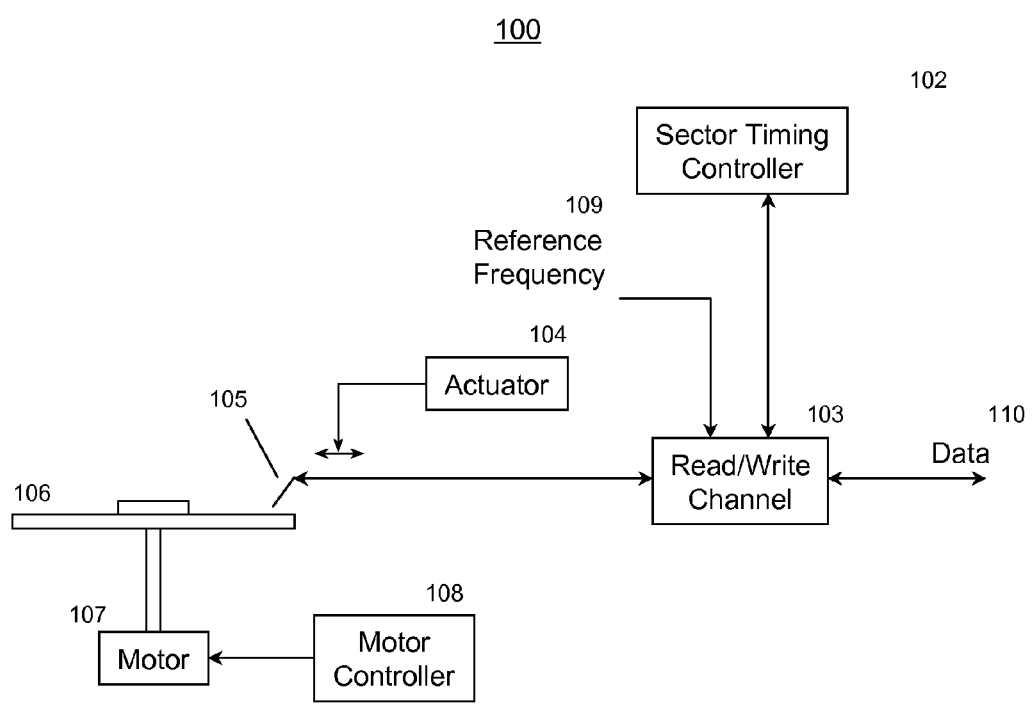
FIG. 1 is a schematic representation of a HDD system.
Figure 2:
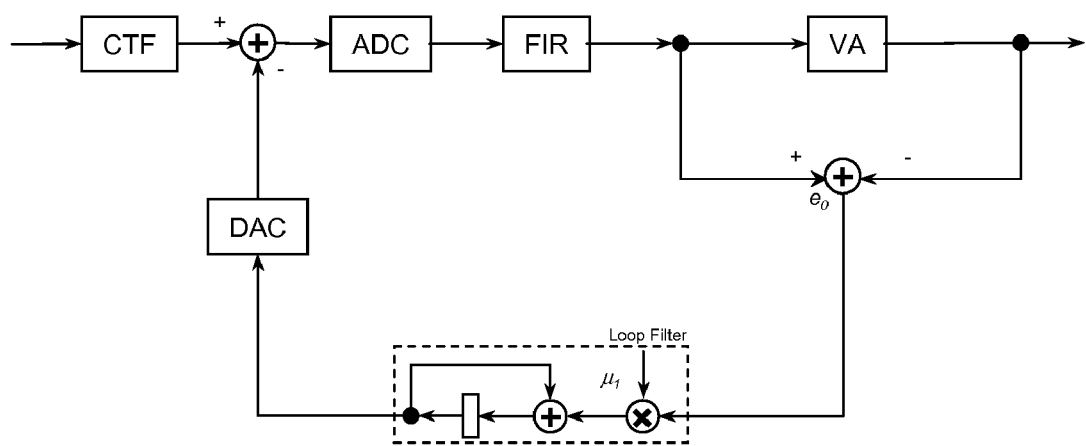
FIG. 2 is one example of conventional circuitry for reducing dc offset.
Figure 3:
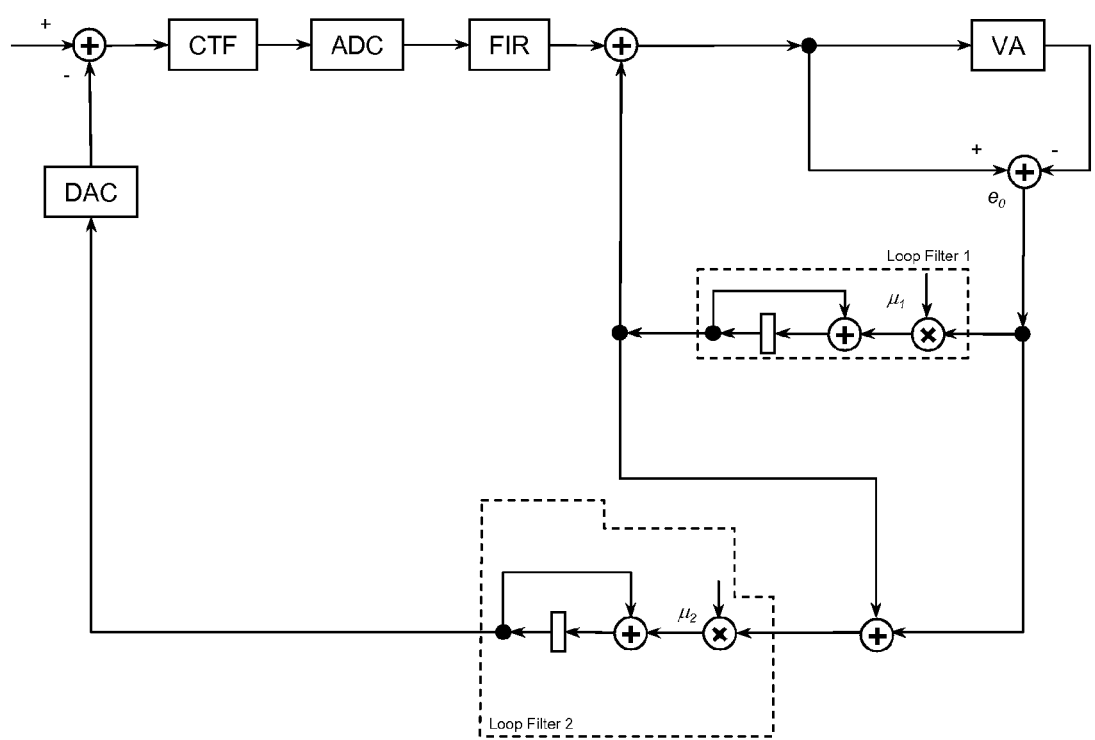
FIG. 3 is another example of conventional circuitry for reducing dc offset.
Figure 4:
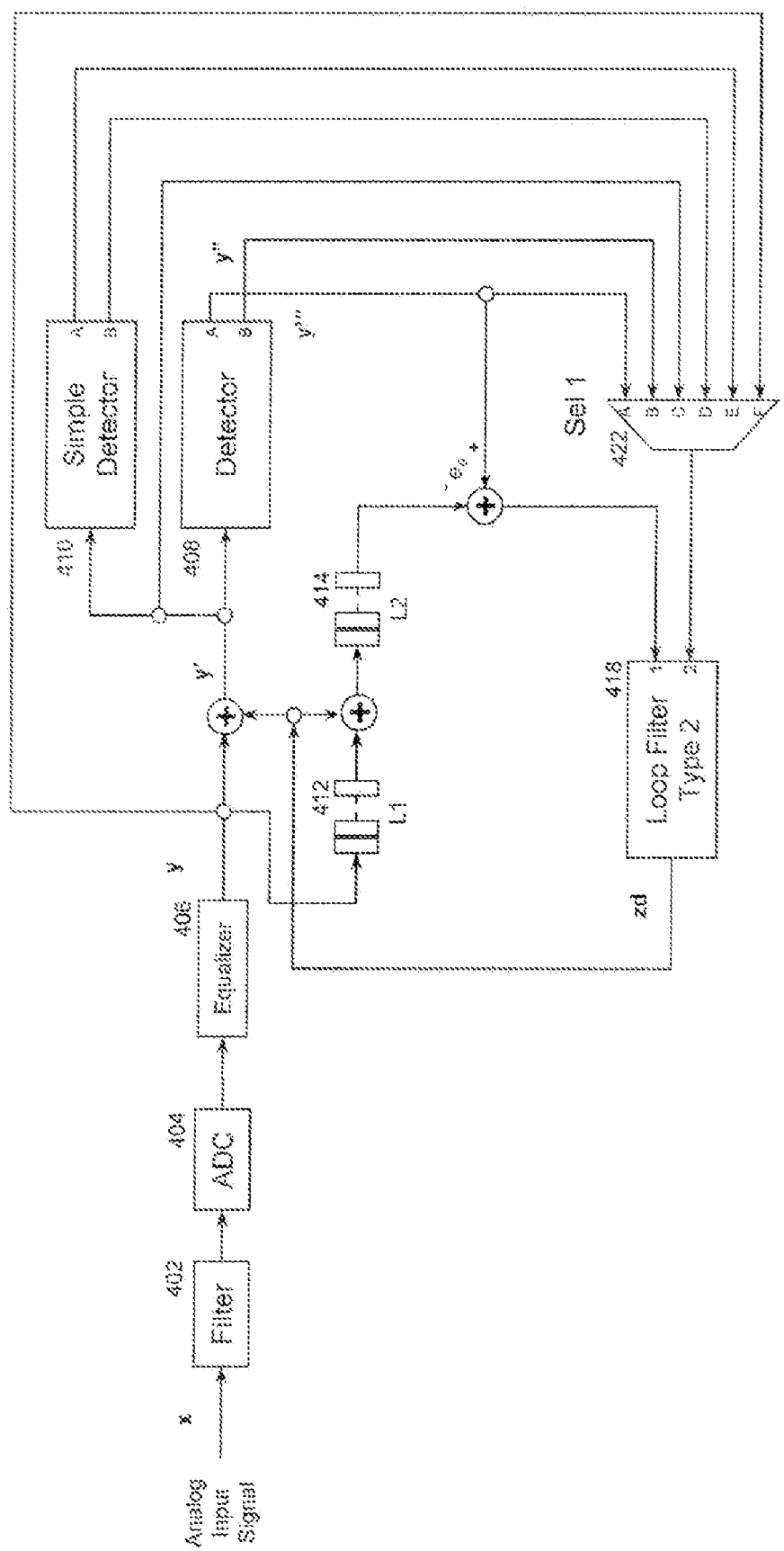
FIG. 4 shows a first embodiment wherein a single loop filter provides correction to a digital signal.

FIG. 4 shows an embodiment of the inventive circuit, wherein a correction loop having a loop filter provides a dc offset correction signal. An analog input signal, x, is processed using a filter 402, an analog-to-digital converter 404, and an equalizer 406 to produce an uncorrected digital signal, y. The filter 404 may be a continuous time filter, and the equalizer 406 may be a finite impulse response filter. The uncorrected digital signal y combines with a digital dc offset correction signal zd, which is the output of the dc correction loop, to form a corrected digital signal y'. The corrected dc signal, y', is the input to a detector 408. The detector 408 may comprise two portions, a first portion being a bit detector, and a second portion being a reconstruction filter coupled to the bit detector. The detector may have two outputs signals, the first output signal is, the output of the reconstruction filter portion and is the ideal noise free detector input y''' (assuming no error in the detector). The second output signal y'' is the output of the bit detector portion before the reconstruction filter. The detector 408 may be a Viterbi detector coupled with a reconstruction filter such as an FIR filter. However, other detectors and filters are possible.

The uncorrected digital signal, y, is delayed through timing loops 412 and 414 (each timing loop 412 and 414 providing a delay of L1 and L2 cycles respectively) and is subtracted from the output of the first output of the first detector 408, y''', to form an error signal e0. The delay L1 introduced by the first timing loop 412 can be 0, 1 or greater so long as the sum of the delays of L1 and L2 equals the total delay caused by the detector 408. The error signal e0 is provided to the first loop input.

A simple detector 410 may also be provided. The simple detector 410, preferably having a small latency, may be a detector such as a decision feedback detector, peak detector, or threshold detector. Such detectors are well known in the art. The simple detector 410 may also include a reconstruction filter such as an FIR filter. The simple detector 410 may provide one or two outputs, the first output is provided by the reconstruction filter while the second output is the output of the detector before the reconstruction filter.

The second loop input may be one of several signals: the first or second output of the detector, the corrected digital signal y', the first or second output of the simple detector, or the uncorrected digital signal y. When one or more of the signals are present for selection as the second loop input, a selector 422 may also be provided. The selector 422 may be an active device or may be wiring choice.

The loop filter 418 provides the digital dc offset correction signal zd. The correction signal zd also corrects the first correction loop after being delayed L2 cycles by delay loop 414. Because the digital dc offset correction applied to the loop filter is only delayed L2 cycles rather than the total delay, the response time of the correction loop is shortened.

Figure 5:
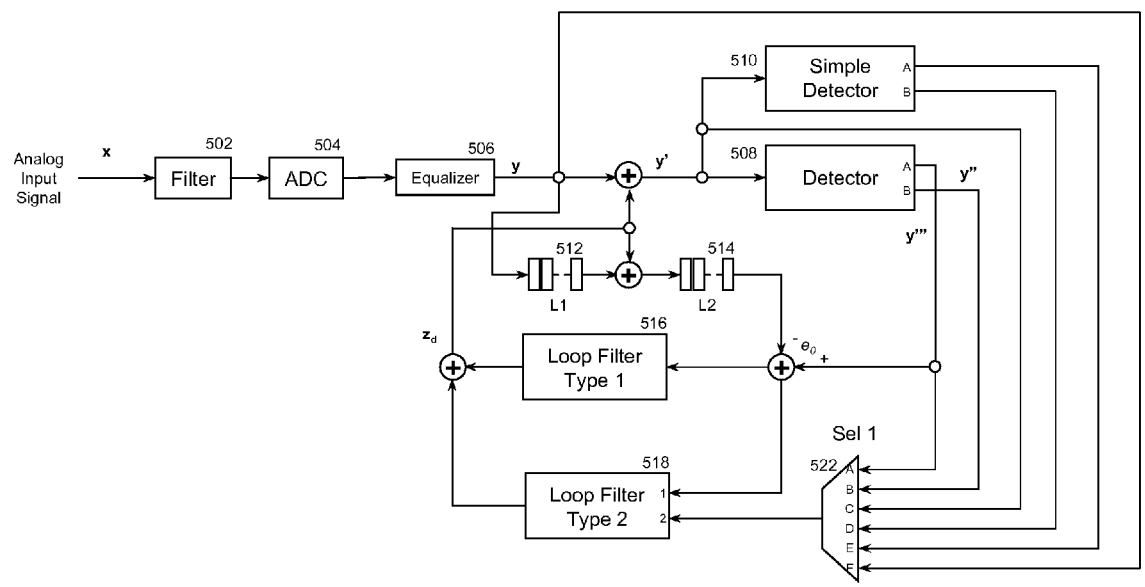
FIG. 5 shows another embodiment of the dc offset correction circuitry wherein a first and a second loop filter provide correction to a digital signal.

FIG. 5 shows another embodiment of the inventive circuitry wherein a second loop filter 518 is added to the embodiment of FIG. 4. In this embodiment, the dc offset correction signal zd is the sum of the outputs of the first and second loop filters 516, 518 and is added to the uncorrected digital signal y to provide the corrected digital signal y'. The first loop filter 516 has a first loop input responsive to the error signal e0, and the second loop filter 518 has a second and a third loop input. The second loop input is responsive to the error signal e0, and the third loop input is one of several signals: the first or second output of the first detector, the corrected digital signal y', the first or second output of the second detector, or the uncorrected digital signal y.

Figure 6:
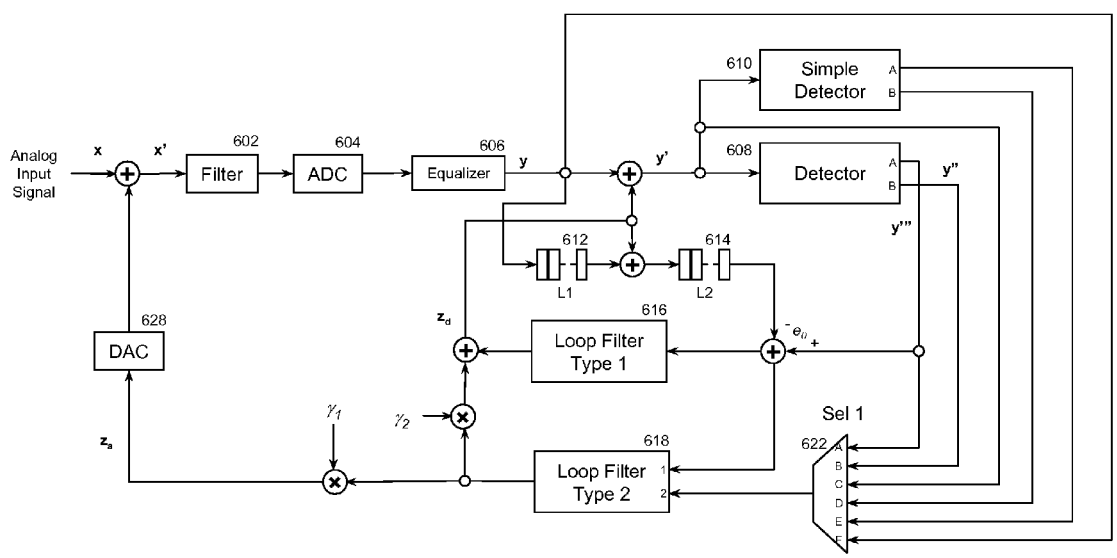
FIG. 6 shows yet another embodiment of the dc offset correction circuitry wherein a first and a second loop filter provide dc offset correction to both an analog and a corresponding digital signal.

FIG. 6 shows still another embodiment, wherein the inventive circuitry of FIG. 5 also provides for correcting the dc offset in both the analog and digital domains. The second loop filter 618 provides a dc offset correction signal that is split into two portions; a first portion of the second loop filter 618 output combines with the output of the first loop filter 616 to form the digital dc offset correction signal zd for correcting dc offset in the digital domain. A second portion of the second loop filter 618 output, the analog dc offset correction signal za, passes through a digital-to-analog converter 628 for correcting the dc offset in the analog domain. The analog dc offset correction signal za combines with the analog input signal x form the corrected analog input signal x'. Gains γ1 and γ2 determine the portions of the second loop filter 618 output provide dc offset correction in the analog and digital domains respectively. In one version of this implementation, γ1+γ2=1, though other values of γ1 and γ2 are possible.

Figure 7:
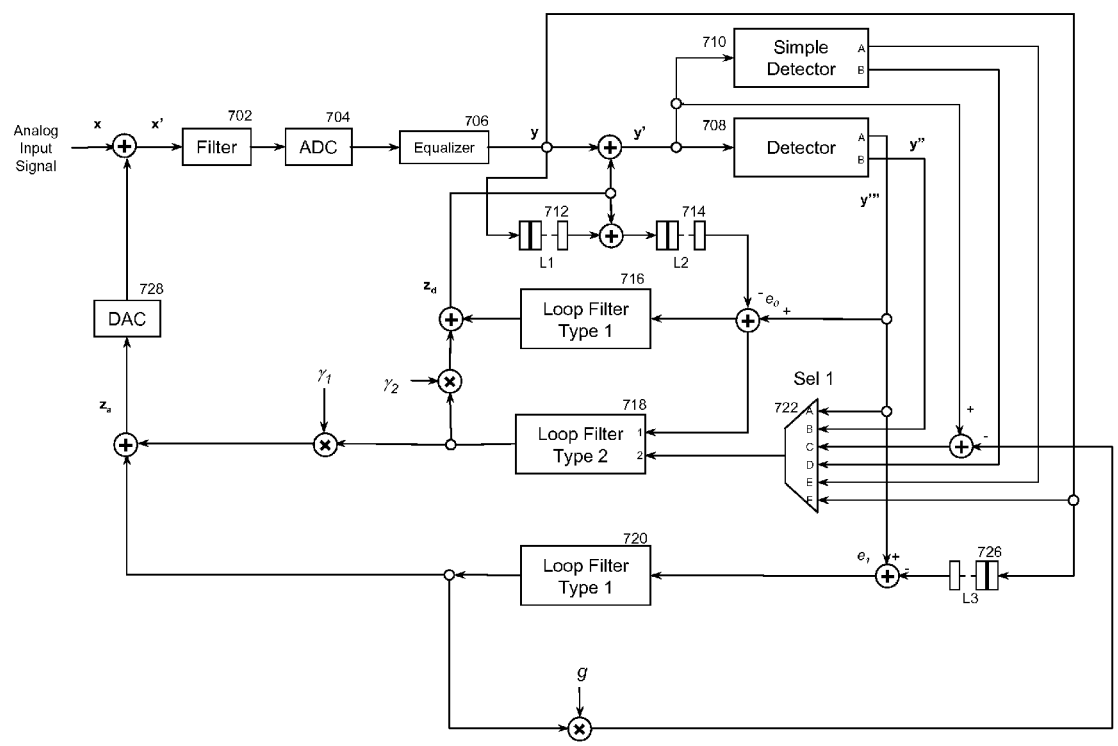
FIG. 7 shows still yet another embodiment of the dc correction circuitry wherein a first, a second, and a third loop filter provide dc offset correction. The first and second loop filters provide dc offset correction to a digital signal whereas the second and third loop filter provide dc offset correction to an analog signal.

FIG. 7 shows still yet another embodiment, wherein a third loop filter is added to the circuitry of FIG. 6 to provide additional correction in the analog domain. The third loop filter 720 has a fourth loop input responsive to a second error signal, e1. The second error signal e1 is the difference between the first output of the detector 708 (the reconstruction filter portion) and the uncorrected digital signal. The uncorrected digital signal is delayed L3 cycles by timing loop 726 to account for the delay in the output of the detector 708. The corrected digital signal to the third loop input is modified to remove the effect of the third loop filter. A portion of the third loop filter output is subtracted from the corrected digital signal, and the portion of the third loop filter output to be removed is determined by the gain adjustment g.

The third loop filter 720 output combines with the second portion of the second loop filter 718 output to provide an analog dc offset correction signal za. The analog dc offset correction signal, za, passes through the digital-to-analog converter 728 and combines with the analog input signal x to form the corrected analog input signal x'.

Figure 8:
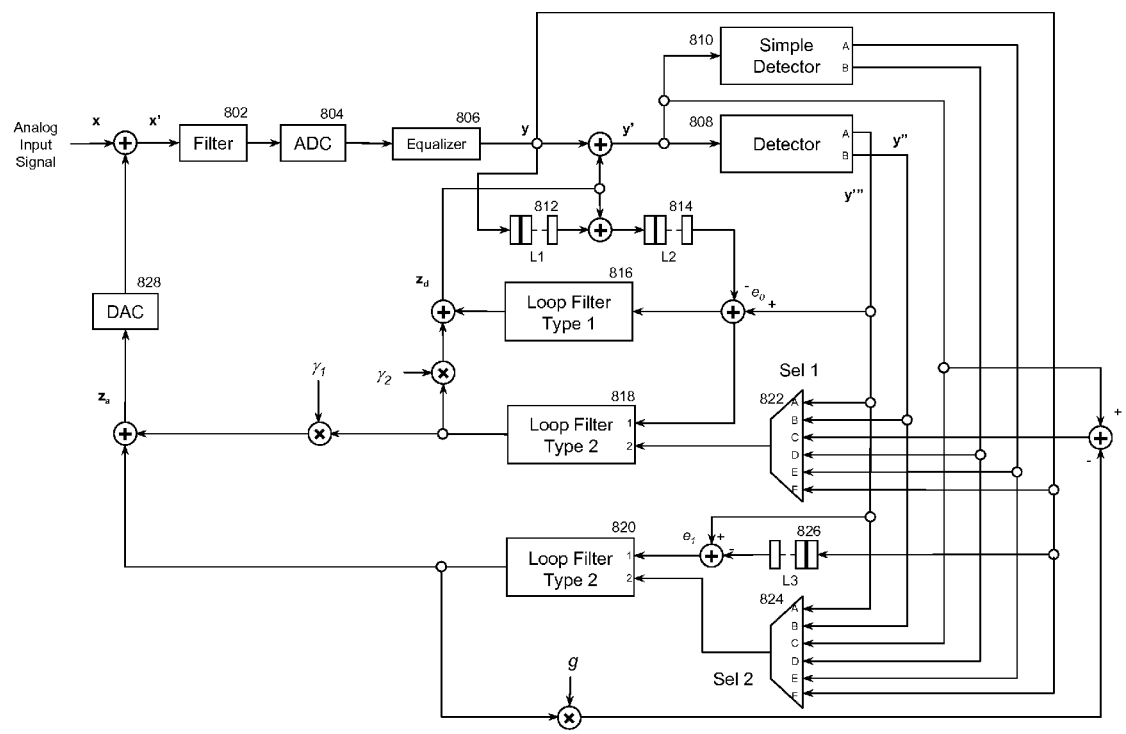
FIG. 8 shows an additional embodiment wherein the third loop filter has a first and a second input, wherein the second input to the third loop filter may be selected independently from the second input to the second loop filter.

FIG. 8 shows an additional embodiment wherein the third loop filter of FIG. 7 has a fourth and a fifth loop input. The fourth loop input is the second error signal e1 as described above, and the fifth loop input is one of the first or second output of the first detector, the corrected digital signal y', the first or second output of the second detector, or the uncorrected digital signal y.

The signal to the fifth loop input may be supplied by a second selector 824 that operates independently from the first selector 822. Each selector 822, 824 may be an active device or may be a wiring selection as appropriate.

Figure 10:
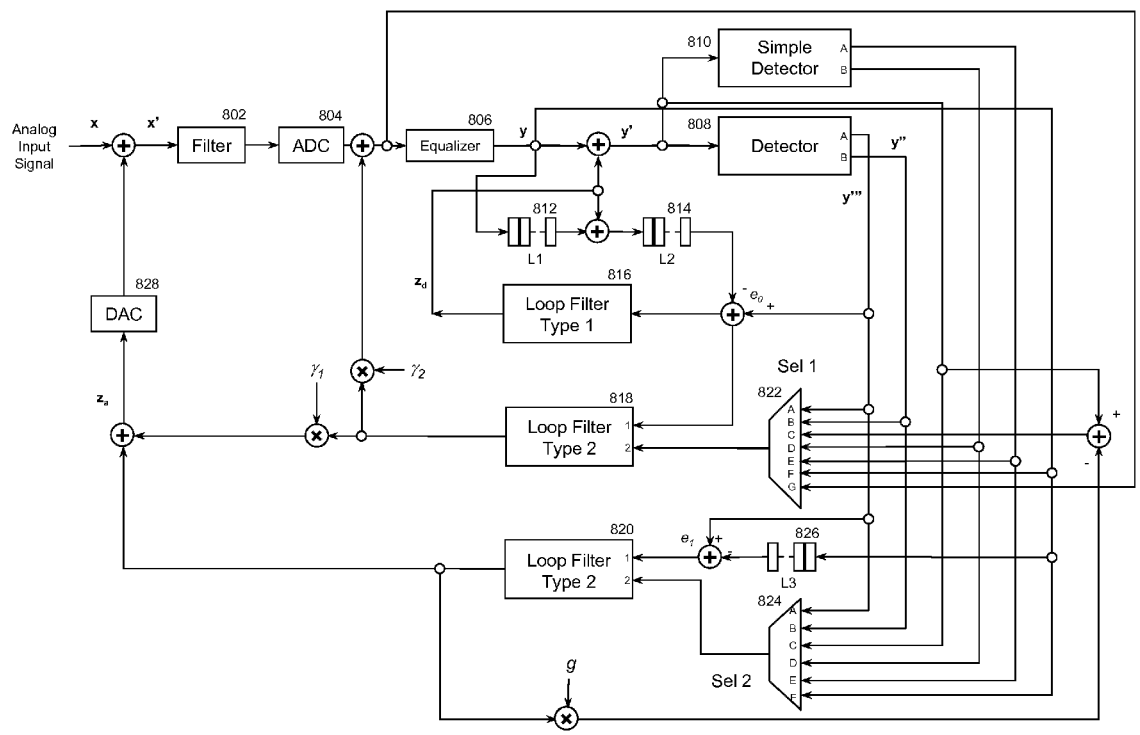
FIG. 10 shows an additional embodiment which is a variant of the embodiment of FIG. 8.

FIG. 10 shows an additional embodiment which is a variant of the FIG. 8 embodiment. In FIG. 10, the output of the multiplier with the γ2 input is provided as an input to an adder that also receives the output of ADC 804, rather than as an input to an adder that also receives the output of loop filter 816. The output of the adder is an input to equalizer 806, and also to selector 822.

The foregoing description depicts both an apparatus for removing dc offset, and a method for removing dc offset. The invention may be embodied in a computer product containing program code for performing the inventive method. Examples of such computer products include, but are not limited to many different types of removable and fixed media which are well known to ordinarily skilled artisans, as well as mechanisms by which software may be transmitted over various types of local networks and wider-spanning networks, including the Internet.

Therefore, the foregoing is illustrative only of the principles of the invention. Further, those skilled in the art will recognize that numerous modifications and changes are possible, the disclose of these embodiments does not limit the invention to the exact construction and operation, and accordingly, all suitable modifications and equivalents fall within the scope of the invention.

I claim:

1. An apparatus for removing dc offset from a digital signal, the apparatus comprising:

a first detector responsive to a corrected digital signal, wherein the first detector provides a first output comprising binary signals and a second output comprising a substantially error free detector input;

a circuit to produce an error signal, wherein the error signal is the difference between the second output and the sum of an uncorrected digital signal and a dc offset correction signal, wherein the uncorrected digital signal is delayed by a first amount, and wherein the dc offset correction signal is delayed by a second amount;

a first dc offset correction feedback loop responsive to a first loop input, the first dc offset correction feedback loop further comprising a first loop filter; and a second dc offset correction feedback loop responsive to a second loop input and a third loop input, the second dc offset correction feedback loop further comprising a second loop filter;

wherein the first loop input is the error signal, wherein the second loop input is the error signal, wherein the third loop input is one of the corrected digital signal, the uncorrected digital signal, the first output, or the second output, wherein the dc offset correction signal is the output of the first dc offset correction feedback loop, wherein the dc offset correction signal is added to the digital signal to provide the corrected digital signal, and wherein a first portion of the output of the second dc offset correction feedback loop is added to an analog input signal to provide a corrected analog input signal.

2. The apparatus of claim 1, further comprising:

a further adder receiving a second portion of the output of the second dc offset correction feedback loop and an unequalized version of the uncorrected digital signal;

a second detector responsive to the corrected digital signal, wherein the second detector provides a third output comprising binary signals and a fourth output comprising the substantially error free detector input, and a third dc offset correction feedback loop responsive to a fourth loop input, the third dc offset correction feedback loop further comprising a third loop filter, wherein the third loop input is one of the uncorrected digital signal, the first output, the second output, the third output, the fourth output, the unequalized version of the uncorrected digital signal, or a difference between the corrected digital signal and a portion of the output of the third dc offset correction feedback loop.

3. The apparatus of claim 2, wherein the second detector comprises a simple detector.

4. The apparatus of claim 2, wherein the second detector comprises an FIR filter.

5. The apparatus of claim 2, further comprising a first selector coupled to the third loop input for selecting one of the first output, the second output, a difference between the corrected digital signal and a portion of the output of the third dc offset correction feedback loop, the third output, the fourth output, the uncorrected digital signal, or the unequalized version of the uncorrected digital signal.

6. The apparatus of claim 5, wherein the third loop filter comprises:

a fifth gain adjustment circuit to multiply the fourth loop input to produce a fifth product;

a third adder; and a third accumulator responsive to the output from the third adder to generate the output of the third dc offset correction feedback loop, wherein the third adder adds the fifth product to the output of the third dc offset correction feedback loop.

7. The apparatus of claim 2, wherein the third dc offset correction feedback loop is responsive to the fourth loop input and a fifth loop input, wherein the fifth loop input is one of the corrected digital signal, the uncorrected digital signal, the first output, or the second output.

8. The apparatus of claim 7, wherein the fifth loop input is one of the corrected digital signal, the uncorrected digital signal, the first output, the second output, the third output, or the fourth output.

9. The apparatus of claim 8, further comprising a second selector coupled to the fifth loop input for selecting one of the corrected digital signal, the uncorrected digital signal, the first output, the second output, the third output, or the fourth output.

10. A system for removing dc offset from a digital signal, the system comprising:

at least one disk having a surface for storing data thereon;

at least one transducing head for reading information recorded in data tracks on the at least one disk;

a servo actuator for positioning the at least one transducing head;

a communications channel for transmitting data to and from the at least one transducing head, the communications channel providing an input signal related to the digital signal; and the apparatus of claim 1.

11. The system of claim 10, further comprising:

a further adder receiving a second portion of the output of the second dc offset correction feedback loop and an unequalized version of the uncorrected digital signal;

a second detector responsive to the corrected digital signal, wherein the second detector provides a third output comprising binary signals and a fourth output comprising the substantially error free detector input, and a third dc offset correction feedback loop responsive to a fourth loop input, the third dc offset correction feedback loop further comprising a third loop filter, wherein the third loop input is one of the uncorrected digital signal, the first output, the second output, the third output, the fourth output, the unequalized version of the uncorrected digital signal, or a difference between the corrected digital signal and a portion of the output of the third dc offset correction feedback loop.

12. The system of claim 11, wherein the second detector comprises a simple detector.

13. The system of claim 11, wherein the second detector comprises an FIR filter.

14. The system of claim 11, further comprising a first selector coupled to the third loop input for selecting one of the first output, the second output, a difference between the corrected digital signal and a portion of the output of the third dc offset correction feedback loop, the third output, the fourth output, the uncorrected digital signal, or the unequalized version of the uncorrected digital signal.

15. The system of claim 14, wherein the third loop filter comprises:

a fifth gain adjustment circuit to multiply the fourth loop input to produce a fifth product;

a third adder; and a third accumulator responsive to the output from the third adder to generate the output of the third dc offset correction feedback loop, wherein the third adder adds the fifth product to the output of the third dc offset correction feedback loop.

16. The system of claim 11, wherein the third dc offset correction feedback loop is responsive to the fourth loop input and a fifth loop input, wherein the fifth loop input is one of the corrected digital signal, the uncorrected digital signal, the first output, or the second output.

17. The system of claim 16, wherein the fifth loop input is one of the corrected digital signal, the uncorrected digital signal, the first output, the second output, the third output, or the fourth output.

18. The system of claim 17, further comprising a second selector coupled to the fifth loop input for selecting one of the corrected digital signal, the uncorrected digital signal, the first output, the second output, the third output, or the fourth output.

19. An apparatus for removing dc offset from a digital signal, the apparatus comprising:
  a first detector means responsive to a corrected digital signal, wherein the first detector means provides a first output comprising binary signals and a second output comprising a substantially error free detector input;
  a means to produce an error signal, wherein the error signal is the difference between the second output and the sum of an uncorrected digital signal and a dc offset correction signal, wherein the uncorrected digital signal is delayed by a first amount, and wherein the dc offset correction signal is delayed by a second amount;
  a first feedback means responsive to a first loop input, the first feedback means further comprising a first loop filtering means;
  a second feedback means responsive to a second loop input and a third loop input, the second feedback means further comprising a second loop filtering means; and
  wherein the first loop input is the error signal,
  wherein the second loop input is the error signal,
  wherein the third loop input is one of the corrected digital signal, the uncorrected digital signal, the first output, or the second output,
  wherein the dc offset correction signal is the output of the first feedback means,
  wherein the dc offset correction signal is added to the digital signal to provide the corrected digital signal, and
  wherein a first portion of the output of the second feedback means is added to an analog input signal to provide a corrected analog input signal.

20. The apparatus of claim 19, further comprising:
  a further adding means receiving a output of the second portion of the second feedback means and an unequalized version of the uncorrected digital signal;
  a second detector means responsive to the corrected digital signal, wherein the second detector means provides a third output comprising binary signals and a fourth output comprising the substantially error free detector input, and
  a third feedback means responsive to a fourth loop input, the third feedback means further comprising a third loop filter means,
  wherein the third loop input is one of the uncorrected digital signal, the first output, the second output, the third output, the fourth output, the unequalized version of the uncorrected digital signal, or a difference between the corrected digital signal and a portion of the output of the third feedback means.

21. The apparatus of claim 20, wherein the second detector means comprises a simple detector.

22. The apparatus of claim 20, wherein the second detector means comprises an FIR filter.

23. The apparatus of claim 20, further comprising a first selector means coupled to the third loop input for selecting one of the first output, the second output, a difference between the corrected digital signal and a portion of the output of the third feedback means, the third output, the fourth output, the uncorrected digital signal, or the unequalized version of the uncorrected digital signal.

24. The apparatus of claim 23, wherein the third loop filter means comprises:
  a fifth gain adjusting means to multiply the fourth loop input to produce a fifth product;
  a third adding means; and
  a third accumulator responsive to the output from the third adding means to generate the output of the third feedback means,
  wherein the third adding means adds the fifth product to the output of the third feedback means.

25. The apparatus of claim 20, wherein the third feedback means is responsive to the fourth loop input and a fifth loop input,
  wherein the fifth loop input is one of the corrected digital signal, the uncorrected digital signal, the first output, or the second output.

26. The apparatus of claim 25, wherein the fifth loop input is one of the corrected digital signal, the uncorrected digital signal, the first output, the second output, the third output, or the fourth output.

27. The apparatus of claim 26, further comprising a second selector means coupled to the fifth loop input for selecting one of the corrected digital signal, the uncorrected digital signal, the first output, the second output, the third output, or the fourth output.

28. A system for removing dc offset from a digital signal, the system comprising:
  means for storing data on a rotating disk, said means for storing data having at least one transducing head for reading information recorded in data tracks on the rotating disk;
  means for positioning the at least one transducing head;
  means for transmitting data to and from the at least one transducing head, said means for transmitting data providing an input signal;
  means for receiving the input signal and for providing a digital signal; and
  the apparatus of claim 19.

29. The system of claim 28, further comprising:
  a further adding means receiving a output of the second portion of the second feedback means and an unequalized version of the uncorrected digital signal;
  a second detector means responsive to the corrected digital signal, wherein the second detector means provides a third output comprising binary signals and a fourth output comprising the substantially error free detector input, and
  a third feedback means responsive to a fourth loop input, the third feedback means further comprising a third loop filter means,
  wherein the third loop input is one of the uncorrected digital signal, the first output, the second output, the third output, the fourth output, the unequalized version of the uncorrected digital signal, or a difference between the corrected digital signal and a portion of the output of the third feedback means.

30. The system of claim 29, wherein the second detector means comprises a simple detector.

31. The system of claim 29, wherein the second detector means comprises an FIR filter.

32. The system of claim 29, further comprising a first selector means coupled to the third loop input for selecting one of the first output, the second output, a difference between the corrected digital signal and a portion of the output of the third feedback means, the third output, the fourth output, the uncorrected digital signal, or the unequalized version of the uncorrected digital signal.

33. The system of claim 32, wherein the third loop filter means comprises:
  a fifth gain adjusting means to multiply the fourth loop input to produce a fifth product;
  a third adding means; and a third accumulator responsive to the output from the third adding means to generate the output of the third feedback means, wherein the third adding means adds the fifth product to the output of the third feedback means.

34. The system of claim 29, wherein the third feedback means is responsive to the fourth loop input and a fifth loop input, wherein the fifth loop input is one of the corrected digital signal, the uncorrected digital signal, the first output, or the second output.

35. The system of claim 34, wherein the fifth loop input is one of the corrected digital signal, the uncorrected digital signal, the first output, the second output, the third output, or the fourth output.

36. The system of claim 35, further comprising a second selector means coupled to the fifth loop input for selecting one of the corrected digital signal, the uncorrected digital signal, the first output, the second output, the third output, or the fourth output.

37. A method for removing dc offset from a digital signal, the method comprising:

processing a corrected digital signal to provide a first output comprising binary signals and a second output comprising a substantially error free detector input;

generating an error signal by subtracting the sum of an uncorrected digital signal and a dc offset correction signal from the second output, wherein the uncorrected digital signal is delayed by a first amount, and wherein the sum of the delayed uncorrected digital signal and the dc offset correction signal is delayed by a second amount;

generating an output of a first dc offset correction feedback loop and an output of a second dc offset correction feedback loop, wherein the output of the first dc offset correction feedback loop is responsive to a first loop input, and wherein the output of the second dc offset correction feedback loop is responsive to a second loop input and a third loop input; and adding the dc offset correction signal to the digital signal thereby removing dc offset from the digital signal and generating the corrected digital signal, wherein the first loop input is the error signal, wherein the second loop input is the error signal, and wherein the third loop input is one of the corrected digital signal, the uncorrected digital signal, the first output, or the second output, and wherein the dc offset correction signal is the output of the first dc offset correction feedback loop, wherein the dc offset correction signal is added to the digital signal to provide the corrected digital signal, and wherein a first portion of the output of the second dc offset correction feedback loop is added to an analog input signal to provide a corrected analog input signal.

38. The method of claim 37, further comprising:

adding a output of the second portion of the second dc offset correction feedback loop and an unequalized version of the uncorrected digital signal;

processing the corrected digital signal to provide a third output comprising binary signals and a fourth output comprising the substantially error free detector input, and processing a fourth loop input in a third dc offset correction feedback loop responsive to a fourth loop input, wherein the third loop input is one of the uncorrected digital signal, the first output, the second output, the third output, the fourth output, the unequalized version of the uncorrected digital signal, or a difference between the corrected digital signal and a portion of the output of the third dc offset correction feedback loop.

39. The method of claim 38, further comprising selecting one of the first output, the second output, a difference between the corrected digital signal and a portion of the output of the third dc offset correction feedback loop, the third output, the fourth output, the uncorrected digital signal, or the unequalized version of the uncorrected digital signal as the third loop input.

40. The method of claim 38, wherein the third dc offset correction feedback loop is responsive to the fourth loop input and a fifth loop input, wherein the fifth loop input is one of the corrected digital signal, the uncorrected digital signal, the first output, or the second output.

41. The method of claim 40, wherein the fifth loop input is one of the corrected digital signal, the uncorrected digital signal, the first output, the second output, the third output, or the fourth output.

42. The method of claim 41, further comprising selecting one of the corrected digital signal, the uncorrected digital signal, the first output, the second output, the third output, or the fourth output as the fifth loop input.

43. A method of removing dc offset from a digital signal in a disk drive, the method comprising:

storing data in data tracks on a rotating disk by positioning at least one transducing head over the disk;

transmitting data to and from the at least one transducing head to provide a digital signal; and the method of claim 37.

44. The method of claim 43, wherein the storing comprises perpendicular recording of the data in the data tracks.

45. The method of claim 44, wherein the dc offset results from the perpendicular recording.

46. A computer program product comprising a computer readable medium containing program code for performing the method of claim 37.

47. A computer program product comprising a computer readable medium containing program code for performing the method of claim 38.

48. A computer program product comprising a computer readable medium containing program code for performing the method of claim 39.

49. A computer program product comprising a computer readable medium containing program code for performing the method of claim 40.

50. A computer program product comprising a computer readable medium containing program code for performing the method of claim 41.

51. A computer program product comprising a computer readable medium containing program code for performing the method of claim 42.

* * * * *